United States Patent [19]

Nishizawa

[11] Patent Number: 4,626,081

[45] Date of Patent: Dec. 2, 1986

[54] BINOCULAR ALIGNMENT

[75] Inventor: Tadao Nishizawa, Tokyo, Japan

[73] Assignee: Swift Instruments, Inc., Boston, Mass.

[21] Appl. No.: 730,371

[22] Filed: May 3, 1985

[51] Int. Cl.$^4$ .................... G02B 23/02; G02B 7/18
[52] U.S. Cl. .................................. 350/569; 350/287
[58] Field of Search ............... 350/545, 569, 633–634, 350/287

[56] References Cited

U.S. PATENT DOCUMENTS 3,478,608  11/1969  Met ................................ 350/634
3,879,112   4/1975  Hickey .......................... 350/634

FOREIGN PATENT DOCUMENTS 749523  11/1944  Fed. Rep. of Germany ...... 350/287
141961   4/1920  United Kingdom ............... 350/287

Primary Examiner—William H. Punter
Attorney, Agent, or Firm—W. R. Hulbert

[57] ABSTRACT

A binocular viewing device including means for resiliently mounting a prism seat to the binocular body within an enclosed chamber consisting of at least three elongated fasteners spaced about the periphery of the prism seat, with means associated with each fastener for resiliently engaging a first surface of the prism seat to urge the prism seat into fixed contact with the body, and at least one adjusting member extending through the body into the chamber from the outside, the inner end of the adjusting member adapted upon rotation for axial movement relative to the body for engagement upon a second surface of the prism seat in a manner to displace the prism seat from contact with the body, thereby to change the relationship of the plane of the prism seat to the line of viewing from ocular lens to objective lens for changing alignment of the optical system.

3 Claims, 2 Drawing Figures

BINOCULAR ALIGNMENT

BACKGROUND OF THE INVENTION

This invention relates to binoculars.

In the final stages of manufacturing, the optical system of a new binocular must be placed in alignment so that the image will be undistorted when viewed through the eye pieces.

Several alignment procedures have been used in the manufacture of Japanese binoculars:

I. The so-called "orthodox" method comprises the use of a leaf or foil underneath the prism and using the eccentric ring of the objective to effect the adjustment.

II. Next to the "orthodox" method, the most stable system involves mounting the prism seat on its three mutually spaced pads within the prism chamber by means of three pairs of screws, each pair comprising a set screw and an adjusting screw. Use of this arrangement has been known to distort the prism seat some times causing prism chipping.

III. As an alternative to the foregoing, the edges of the prism seat are mounted on the pads by means of single screws with coil springs placed between the bottom surface of the seat and the top surface of the pad. Tightening or loosening of the screws causes adjustment of the seat and correspondingly of the prisms. This arrangement is fairly easy to use but not nearly so stable as the above.

IV. In a fourth system, a prism is tiltably held in its seat, the latter being immovably fastened to the interior wall of the chamber. An adjusting screw pierces the chamber wall and bears against the side of the prism. Turning the screw in or out controls the tilt of the prism for alignment purposes. Since the wall is thin it is difficult to prevent air leakage around the adjusting screw and the integrity of the seal of the chamber is jeopardized. Furthermore, the system inherently lacks stability, although it is the only one permitting adjustment of the alignment after the device has been assembled.

Objects of the present invention include providing a structural configuration that allows stable prism alignment without endangering the seal of the enclosed body cavity; that reduces the danger of introducing tension to the prism seat with the possibility of chipping the prism; that provides for stable alignment; and that can be finely adjusted even by a relatively unskilled worker.

SUMMARY OF THE INVENTION

In accordance with the invention there is provided in a binocular viewing device having a body defining an enclosed chamber, a prism seat disposed within the chamber and mounted to the body, an optical system including prisms disposed upon the prism seat, and an ocular lens and an objective lens positioned at opposite ends of the chamber for viewing therethrough the following improvement.

Means are provided for resiliently mounting the prism seat to the body comprising at least three elongated fasteners spaced about the periphery of the prism seat, with means associated with each fastener for resiliently engaging a first surface of the prism seat to urge the prism seat into fixed contact with the body, and at least one adjusting member extending through the body into the chamber from the outside, the inner end of the adjusting member adapted upon rotation for axial movement relative to the body for engagement upon a second surface of the prism seat in a manner to displace the prism seat from contact with the body, thereby to change the relationship of the plane of the prism seat to the line of viewing from the ocular lens to the objective lens for changing alignment of the optical system.

In preferred embodiments, the adjusting screw is disposed at an acute angle to the axis of the associated setting screw, preferably at an angle of about 35°.

These and other features and advantages of the invention will be understood from the following detailed description of a preferred embodiment taken in conjunction with the annexed drawings and appended claims.

BRIEF DESCRIPTION OF THE DRAWINGS

We first briefly describe the drawings.

DESCRIPTION OF PREFERRED EMBODIMENT

Figures 1, 2:
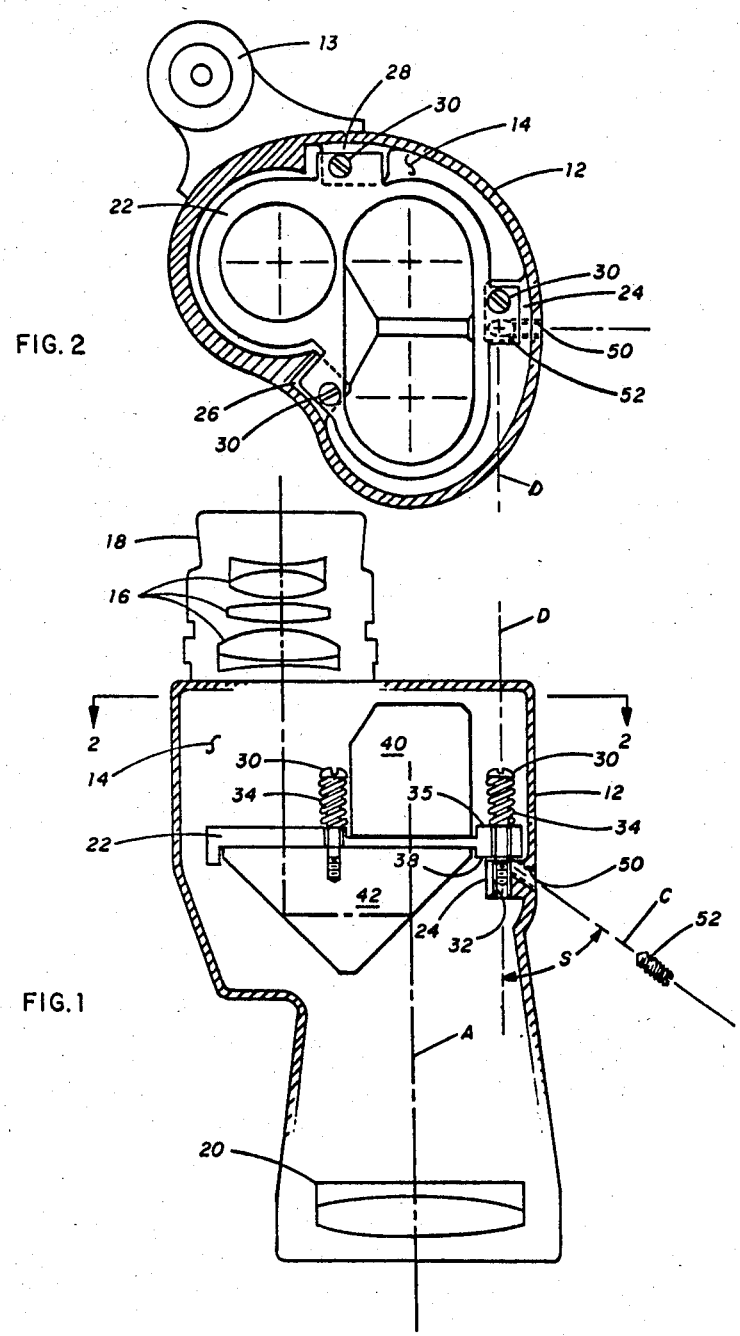
FIG. 1 is a somewhat diagrammatical elevational view, partially in section, of one telescope of a binocular viewing device embodying the invention.
FIG. 2 is a cross-sectional view taken generally on line 2—2 of FIG. 1.

One of the two prismatic telescopes of the pair which comprise a binocular embodying the invention is shown in the two views of the drawing. Since the other telescope is for all intents and purposes identical it has been omitted.

Housing 12 may be hinged by hinge 13 to a corresponding housing (not shown). The housing 12 defines an enclosed chamber 14. At the rear of the chamber are ocular lenses 16 in eyepiece 18, and, at the front of the chamber, is disposed the objective lens 20.

Mounted within the chamber is a prism seat 22 which is supported upon three separate pads 24, 26, 28 extending from the housing body, circumferentially spaced about the wall of the chamber. The prism seat is mounted by means of set screws 30 extending through the seat into threaded holes 32 provided in the pads. A resilient spring 34 is disposed upon the shaft of each set screw between the screw head and the first, or upper, surface 35 of the prism seat. When assembled, the springs are under compression and apply force to the seat to urge the second surface 38 of the seat against the pad.

Supported upon the first and second opposite surfaces of the prism seat are the usual first and second prisms, 40, 42 respectively. The ocular lens, objective lens and prisms are selected and positioned relative to each other according to well-known procedures for providing the desired optical effect for viewing along the line of sight, A, through the lenses and the prisms. During the manufacturing and assembling processes, the lenses and prisms are disposed in positions to provide alignment therebetween that is roughly correct for the desired optical effect. For many reasons, including, e.g., variations in materials or dimensions or, possibly faulty workmanship, and the like, it has been necessary in the industry to provide means for final alignment of the optical system after assembly.

The binocular viewing device of the invention is provided with adjustable means that permit fine alignment after assembly without violation of the enclosed chamber.

As seen in the drawings, a threaded bore 50 extends through the body of the housing penetrating seat support pad 24 and opening on the upper surface of the pad lying beneath the second surface 38 of the seat 22. A threaded adjustment screw 52 is threadedly engaged within the bore and is rotated to a position leaving the head recessed within the housing and the tip recessed from engagement with the surface 38 of the seat. The screw effects an enclosed seal with the internal surface of the bore so as not to affect adversely the integrity of the enclosed chamber 14. This is because the bore is of substantial length and subject to ready sealing against passage of air.

To effect alignment of the optical system, the adjustment screw is rotated to cause it to advance axially along axis, C, into contact with the seat surface. Continued rotation urges the seat off the pad, overcoming the resilient force applied by the opposed spring, thus changing the angle of the plane of the prism seat relative to the line of sight between the ocular and objective lenses. The adjustment screw may be rotated in either direction as desired, to raise or lower the seat with respect to the pad to achieve the desired alignment.

The adjustment screw 52 is disposed at angle S to the axis, D, of the set screw 30, preferably of the order of about 35°. This relationship results in a fractional ratio of movement of the seat along axis D to movement of the adjustment screw along axis C to enable fine adjustment of optical system alignment, even by a relatively unskilled worker without placing any strain on the prisms or impairing the seal of the chamber.

While there is herein disclosed and described a presently preferred embodiment of the invention, it nevertheless will be understood that the same is by way of illustration and not limita- tion and the scope of the invention is to be measured only by the proper interpretation of the appended claims.

Other embodiments are within the following claims, for example more than one adjusting member may be employed.

What is claimed is:

1. In a binocular viewing device comprising a body defining an enclosed chamber, a prism seat disposed within said chamber and mounted to said body, and an optical system including prisms disposed upon said prism seat, and an ocular lens and an objective lens positioned at opposite ends of said chamber for viewing therethrough, via said prisms, the improvement wherein said device further comprises means for resiliently mounting said prism seat to said body comprising at least three elongated fasteners spaced about the periphery of said prism seat, with means associated with each said fastener for resiliently engaging a first surface of said prism seat to urge said prism seat into fixed contact with said body, and at least one adjusting member extending through said body into said chamber from the outside, the inner end of said adjusting member adapted upon rotation for axial movement relative to said body for engagement upon a surface of said prism seat in a manner to displace said prism seat from contact with the body, thereby to change the relationship of the plane of the prism seat to the line of viewing from said ocular lens to said objective lens for changing alignment of the optical system.

2. The binocular viewing device of claim 1 wherein said adjusting member is disposed at an acute angle to the axis of an associated elongated fastener.

3. The binocular viewing device of claim 2 wherein the angle of said adjusting member to the axis of said fastener is of the order of 35°.

* * * * *